US008930071B2

(12) United States Patent
Luecking et al.

(10) Patent No.: US 8,930,071 B2
(45) Date of Patent: Jan. 6, 2015

(54) ANTI-SOUND SYSTEM FOR EXHAUST SYSTEMS AND METHOD FOR CONTROLLING THE SAME

(75) Inventors: Christof Luecking, Wetter (DE); Andre Mengel, Bad Boll (DE)

(73) Assignee: Eberspaecher Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 13/541,329

(22) Filed: Jul. 3, 2012

(65) Prior Publication Data

US 2013/0013147 A1 Jan. 10, 2013

(30) Foreign Application Priority Data

Jul. 5, 2011 (DE) .......................... 10 2011 106 647

(51) Int. Cl.
*G10K 15/00* (2006.01)
*F01N 1/06* (2006.01)
*F01N 9/00* (2006.01)
*G10K 11/178* (2006.01)

(52) U.S. Cl.
CPC ........ *F01N 1/065* (2013.01); *F01N 9/00* (2013.01); *G10K 11/1782* (2013.01); *Y02T 10/47* (2013.01)
USPC ............. 701/36; 704/205; 704/500; 181/227; 181/250

(58) Field of Classification Search
CPC ................. G10K 2210/1282; G10K 11/1788; G10K 11/1786; G10K 11/178; G10K 11/1784; G10K 15/00
USPC ......... 700/94; 704/500, 233, 205; 381/93, 92, 381/71.7, 71.6, 71.2, 71.11, 57, 310, 20, 381/120, 113, 107
See application file for complete search history.

(56) References Cited

U.S. PATENT DOCUMENTS

| | | | |
|---|---|---|---|
| 4,177,874 A | 12/1979 | Angelini et al. | |
| 4,677,676 A | 6/1987 | Eriksson | |
| 4,837,834 A | 6/1989 | Allie | |
| 5,229,556 A | 7/1993 | Geddes | |
| 5,233,137 A | 8/1993 | Geddes | |
| 5,336,856 A | 8/1994 | Krider et al. | |
| 5,343,533 A | 8/1994 | Geddes | |
| 5,432,857 A | 7/1995 | Geddes | |
| 5,577,127 A | 11/1996 | Van Overbeek | |
| 5,600,106 A | 2/1997 | Langley | |
| 5,619,020 A | 4/1997 | Jones et al. | |
| 5,703,337 A | 12/1997 | Geisenberger | |
| 6,252,967 B1* | 6/2001 | Moore et al. | 381/93 |
| 6,795,588 B1* | 9/2004 | Nio et al. | 382/261 |
| 7,753,165 B2 | 7/2010 | Kassner | |
| 8,385,458 B2* | 2/2013 | Yanagisawa et al. | 375/295 |
| 2001/0021258 A1* | 9/2001 | Nagel | 381/71.4 |
| 2001/0022532 A1* | 9/2001 | Dolman | 330/149 |
| 2006/0037808 A1 | 2/2006 | Kruger et al. | |
| 2008/0053747 A1 | 3/2008 | Krueger et al. | |
| 2008/0173496 A1 | 7/2008 | Kassner | |
| 2009/0180527 A1* | 7/2009 | Asami | 375/226 |
| 2009/0255754 A1 | 10/2009 | Kruger et al. | |
| 2010/0061564 A1* | 3/2010 | Clemow et al. | 381/71.6 |
| 2010/0195706 A1* | 8/2010 | Yanagisawa et al. | 375/226 |
| 2011/0000734 A1 | 1/2011 | Kroger et al. | |
| 2012/0195439 A1* | 8/2012 | Ohta et al. | 381/71.4 |

FOREIGN PATENT DOCUMENTS

| | | |
|---|---|---|
| DE | 19751596 | 6/1999 |
| DE | 69420232 | 5/2000 |
| DE | 102006042224 | 1/2008 |
| DE | 102006061564 | 7/2008 |
| DE | 102008018085 | 10/2009 |
| DE | 102009031848 | 1/2011 |
| EP | 0373188 | 12/1993 |
| EP | 0674097 | 9/1995 |
| EP | 0755045 | 1/1997 |
| EP | 0837452 A2 | 4/1998 |
| EP | 0916817 | 5/1999 |
| EP | 1055804 | 11/2000 |
| EP | 1 158 488 | 11/2001 |
| EP | 1627996 | 2/2006 |
| JP | 06-059681 | 3/1994 |
| JP | 11-325168 | 11/1999 |

(Continued)

OTHER PUBLICATIONS

Japanese Patent Office, Japanese office action for Patent Application No. 2012-148598 dated Apr. 16, 2013 and the English translation thereof.

(Continued)

*Primary Examiner* — Helal A Algahaim
*Assistant Examiner* — Jelani Smith
(74) *Attorney, Agent, or Firm* — Morris & Kamlay LLP (57) ABSTRACT

Based on sound measured in the interior of an exhaust system components of an ideal control signal are calculated, the components comprising sine wave oscillations comprising amplitudes phase-shifted by 90° relative to each other. From the amplitudes, an overall amplitude is calculated. If the overall amplitude is greater than a reference amplitude, calculating a correction factor from the reference amplitude and the overall amplitude, weighting the amplitudes with the correction factor to obtain weighted amplitudes, and forming the sum of the products of the weighted amplitudes with the associated sine wave oscillations and outputting the sum as control signal to a loudspeaker, follows. Otherwise, if the overall amplitude is smaller or equal to the reference amplitude, forming the sum of the products of the amplitudes of the ideal control signal with the associated sine wave oscillations and outputting the sum as control signal to the loudspeaker, follows.

26 Claims, 5 Drawing Sheets

(56) References Cited

FOREIGN PATENT DOCUMENTS

| JP | 2000-099037 | 4/2000 |
| JP | 2001-333490 | 11/2001 |
| JP | 2007-2722008 | 10/2007 |
| WO | 93/21428 A1 | 10/1993 |

OTHER PUBLICATIONS

Extended European Search Report, Oct. 23, 2012, 5 pages.
Wikipedia: Lautsprecher. Version dated Jun. 6. 2011. Visited on Apr. 18, 2002. Available at: http://de.wikipedia.org/w/index.php?title=Lautsprecher&oldid=90262058. German and English Version.

* cited by examiner

ANTI-SOUND SYSTEM FOR EXHAUST SYSTEMS AND METHOD FOR CONTROLLING THE SAME

CROSS-REFERENCE TO RELATED APPLICATIONS

This application is a Paris Convention of German Application Serial No. 10 2011 106 647.4, filed Jul. 5, 2011, which is incorporated by reference in its entirety.

The invention relates to an anti-sound system for exhaust systems and a method for controlling the same. In particular, the present invention relates to an active cancellation or influencing of sound waves in exhaust systems of combustion engine-operated vehicles.

Regardless of the design of a combustion engine (for example reciprocating piston engine, rotary piston engine or free piston engine), noises are generated as a consequence of the working cycles (in particular aspirating and compressing a fuel-air mixture, working and expelling the combusted fuel-air mixture), which take place in succession. On the one hand, these noises pass through the combustion engine as structure-borne sound and are radiated outside on the combustion engine as airborne sound. On the other hand, the noises pass through an exhaust system of the combustion engine as airborne sound together with the combusted fuel-air mixture.

These noises are frequently perceived to be disadvantageous. On the one hand, there are legal provisions regarding noise protection, which have to be adhered to by manufacturers of combustion engine-operated vehicles. These legal provisions as a rule stipulate a maximum permissible sound pressure during the operation of the vehicle. On the other hand, manufacturers attempt to impart a characteristic sound development to the vehicles produced by them and operated with combustion engines, which suit the image of the respective manufacturer and are intended to attract the customers. This characteristic noise development often can no longer be naturally ensured in the case of modern engines with low cubic capacity.

The noises passing through the combustion engine as structure-borne sound can be well insulated and therefore do not constitute any problem with respect to noise protection as a rule.

The noises passing through an exhaust system of the combustion engine as airborne sound together with the combusted fuel-air mixture are reduced through silencers arranged before the orifice of the exhaust system, which are connected downstream of any existing catalytic converters. Such silencers can operate for example according to the absorption and/or reflection principle. Both operating modes have the disadvantage that they require a comparatively large volume and put up a relatively high resistance to the combusted fuel-air mixture, as a result of which the overall efficiency of the vehicle drops and the fuel consumption rises.

As alternative or addition to silencers, so-called anti-sound systems have been under development for some time, which superimpose electroacoustically generated anti-sound on the airborne sound generated in the combustion engine and conducted in the exhaust system. Such systems are known for example from the documents U.S. Pat. Nos. 4,177,874, 5,229, 556, 5,233,137, 5,343,533, 5,336,856, 5,432,857, 5,600,106, 5,619,020, EP 0 373 188, EP 0 674 097, EP 0 755 045, EP 0 916 817, EP 1 055 804, EP 1 627 996, DE 197 51 596, DE 10 2006 042 224, DE 10 2008 018 085, and DE 10 2009 031 848.

Such anti-sound systems usually make use of a so-called Filtered-x Least Mean Squares (FxLMS) algorithm, which attempts to regulate an error signal measured by means of an error microphone to zero by outputting sound via at least one loudspeaker fluidically connected to the exhaust system (i.e. fluid (gas/air) inside the loudspeaker communicates with the fluid (gas/air) inside the exhaust system; fluid inside the loudspeaker can flow towards the inside of the exhaust system and vice versa). For achieving a destructive interference of the sound waves of the airborne sound conducted in the exhaust system and of the anti-sound generated by the loudspeaker, the sound waves originating from the loudspeaker have to correspond by amplitude and frequency to the sound waves conducted in the exhaust system, but have a phase shift of 180 degrees relative to these. For each frequency band of the airborne sound conducted in the exhaust pipe, the anti-sound is calculated separately by means of the FxLMS-algorithm, in that a suitable frequency and phase position of two sine wave oscillations shifted by 90 degrees relative to each other are determined, and the amplitude for these sine wave oscillations are calculated. The objective of anti-sound systems is that the sound cancellation is audible and measurable outside, but if required, also within the exhaust system.

A corresponding anti-sound system can be obtained from the company J. Eberspächer GmbH & Co. KG, Eberspächerstrasse 24, 73730 Esslingen, Deutschland (Germany).

By using an anti-sound system, the construction volume of an exhaust system can be reduced by up to 60%, the weight by up to 40% and the exhaust backpressure by up to 150 mbar in comparison to conventional exhaust systems without an anti-sound system. Naturally anti-sound systems may be combined with conventional silencers in the exhaust system.

The designation "anti-sound" serves for the distinction from the airborne sound conducted in the exhaust system. Considered by itself, "anti-sound" is conventional airborne sound.

With known anti-sound systems and methods for controlling the same it is disadvantageous that overloading of the at least one loudspeaker can occur.

It is therefore an object of the present invention to provide an anti-sound system for exhaust systems and a method for controlling the same, which effectively avoid overloading the at least one loudspeaker.

The above object is solved through the combination of the features of the independent claims. Preferred further developments can be found in the subclaims.

Embodiments relate to a method for controlling an anti-sound system for an exhaust system of a combustion engine-operated vehicle for generating an anti-airborne sound in the exhaust system by means of measured sound, in order to cancel at least partially and preferably completely airborne sound generated in a combustion engine and conducted in the exhaust system in the region of the location in the exhaust system, in which the sound is measured. This sound cancellation is to be audible and measurable at least outside the exhaust system, but preferably also within the exhaust system. "In the region of the location in the exhaust system in which the sound is measured" in this case means that the location in which the sound is at least partially cancelled, is spaced along the exhaust gas flow with respect to the exhaust gas flow downstream or upstream by not more than ten times and in particular by not more than 5 times and more particular by not more than double the maximum diameter of the exhaust system at the location at which the sound is measured. In a first step, measuring of sound takes place in the interior of the exhaust system. Following this, components of a first ideal control signal are calculated by means of the measured sound, wherein the components comprise two first sine waves oscillations with first amplitudes phase-shifted relative to each other by 90 degrees. This is followed by a calculation of a first overall amplitude from the first amplitudes, which is followed by a comparison of the first overall amplitude with a predetermined reference amplitude in order to establish if the first overall amplitude is greater than the reference amplitude.

In the event that the first overall amplitude is greater than the reference amplitude it is concluded that damage to a loudspeaker supplied with the ideal control signal cannot be excluded. For this reason, a correction factor is calculated from the reference amplitude and the first overall amplitude, with which the first amplitudes can be weighted, so that weighted first amplitudes are obtained. The sum of the products of the weighted first amplitudes with the associated first sine wave oscillations phase-shifted relative to each other by 90 degrees is output to the at least one loudspeaker as control signal. With a control signal for the at least one loudspeaker derived in such a manner, damage to the at least one loudspeaker can be excluded with high probability.

In the case that the first overall amplitude however is smaller or equal to the reference amplitude, the sum of the products of the first amplitudes of the first ideal control signal is formed with the associated first sine wave oscillations phase-shifted by 90 degrees and output to the at least one loudspeaker as control signal, since damage to the at least one loudspeaker can then be excluded with high probability.

According to an embodiment cancellation takes place in amount and phase.

The proposed method allows an easy adaptation to loudspeakers used for generating anti-sound. Since damage to the loudspeaker can be excluded with high probability there is no longer any requirement to adapt the loudspeakers to a theoretical maximum possible load, for example as a consequence of instabilities. Rather, the loudspeakers can be adapted to an average maximum load that is comparatively lower. As a consequence, loudspeakers with low electric load capacity can be used.

Since the control signal to be output to the at least one loudspeaker is not simply capped altogether but the individual amplitudes of the sine wave oscillations forming the control signal are individually attenuated, the tone quality of the anti-sound remains unchanged, so that merely the amount of the cancellation of the airborne sound generated by the combustion engine and conducted in the exhaust system changes.

According to an embodiment, the first overall amplitude is obtained from the sum of the squares of the first amplitudes by taking the root.

According to an embodiment, the correction factor is the quotient of the reference amplitude and of the first overall amplitude.

According to an embodiment, parallel to the step of calculating the components of the first ideal control signal, components of at least a second ideal control signal are calculated, which comprises second sine wave oscillations with second amplitudes phase-shifted relative to one another by 90 degrees. Here, the frequency of the two first sine wave oscillations phase-shifted relative to each other differs from the frequency of the two second sine wave oscillations of the at least one second ideal control signal phase-shifted relative to each other by 90 degrees. Accordingly, parallel to calculating the first overall amplitude from the second amplitudes, a second overall amplitude is calculated. Even before the step of comparing the first overall amplitude with the predetermined reference amplitude, the first and second overall amplitude are compared with each other. Furthermore, even before the step of comparing the first overall amplitude with the predetermined reference amplitude, the amplitudes of those sine wave oscillations of that ideal control signal are set equal to zero, which has the smaller overall amplitude if the greater overall amplitude is more than 1.5 times the size and in particular more than 2 times the size and further particularly more than 5 times the size of the smaller overall amplitude.

Concretely, this can for example mean setting the amplitudes of the second sine wave oscillations of the at least one second ideal control signal equal to zero, if the first overall amplitude is more than 1.5 times the size of the second overall amplitude, or setting the amplitudes of the first sine wave oscillation of the first ideal control signal equal to zero, if the second overall amplitude is more than 1.5 times the size of the first overall amplitude.

In this way, a dominating ideal control signal is determined and is alone used in the further method. Because of this, the required calculation effort is kept low.

Here, according to an embodiment, the step of calculating the first overall amplitude from the first amplitudes and the calculating of the second overall amplitude from the second amplitudes can comprise taking the root from the sum of the squares of the first and second amplitudes.

Further embodiments relate to a method for controlling an anti-sound system for exhaust systems of a combustion engine-operated vehicle in order to at least partially and preferably completely cancel airborne sound generated in a combustion engine and conducted in the exhaust system in the region of the location in the exhaust system in which the sound is measured. This sound cancellation is to be audible and measurable at least outside the exhaust system, but preferably also within the exhaust system. Here "in the region of the location in the exhaust system, in which the sound is measured" means that the location, in which the sound is at least partially cancelled, with respect to the exhaust flow is spaced along the exhaust gas flow by not more than 10 times and in particular by not more than 5 times and further particularly by not more than double the maximum diameter of the exhaust system at the location in which the sound is measured. The method comprises measuring of sound in the interior of an exhaust system and calculating components of a first and at least one second ideal control signal for generating an anti-airborne sound in the exhaust system by means of the measured sound, wherein the components each comprise two first and second sine wave oscillations with first and second amplitudes phase-shifted relative to each other by 90 degrees, wherein the frequency of the two first sine wave oscillations of the first ideal control signal phase-shifted by 90 degrees differs from the frequency of the two second sine wave oscillations of the second ideal control signal phase-shifted by 90 degrees. Following this, a first overall amplitude is calculated from the first amplitudes and a second overall amplitude is calculated from the second amplitudes. The amounts (i.e. absolute values) of the first and second overall amplitudes are added in order to obtain an absolute overall amplitude. This absolute overall amplitude is compared with a predetermined reference amplitude in order to determine if the absolute overall amplitude is greater than the reference amplitude. By doing so it is determined if the absolute overall amplitude of the ideal control signals exceeds the load capacity of an employed loudspeaker or not.

In the case that the absolute overall amplitude is greater than the reference amplitude, and thus an overloading of the at least one loudspeaker has to be expected, an absolute correction factor is calculated from the reference amplitude and the absolute overall amplitude. The first and second amplitudes in each case are weighted with the absolute correction factor in order to obtain weighted first and second amplitudes.

The sums of the respective products of the weighted first and second amplitudes with the associated first and second sine wave oscillations phase-shifted by 90 degrees are output to the at least one loudspeaker as control signal.

In the case that the absolute overall amplitude however is smaller or equal to the reference amplitude, and an overloading of the at least one loudspeaker thus need not be expected, the sums of the products of the first and second amplitudes of the first and second ideal control signal with the associated first and second sine wave oscillations phase-shifted by 90 degrees are output as control signal to the at least one loudspeaker.

In this manner, a control signal including a plurality of frequencies of the anti-sound can be limited in a simple manner, without the continuously changing phase relationship between the frequencies having to be taken into consideration.

According to an embodiment cancellation takes place in amount and phase.

According to an embodiment, the absolute correction factor is the quotient from reference amplitude and the absolute overall amplitude.

Further embodiments relate to a method for controlling an anti-sound system for exhaust systems of a combustion engine-operated vehicle, in order to at least partially and preferably completely cancel airborne sound generated by a combustion engine and conducted in the exhaust system in the region of the location in the exhaust system, in which the sound is measured. This sound cancellation is to be audible and measurable at least outside the exhaust system, but preferably also within the exhaust system. Here "in the region of the location in the exhaust system, in which the sound is measured" means that the location, in which the sound is at least partially cancelled, is spaced along the exhaust gas flow with respect to the exhaust gas flow downstream or upstream by not more than 10 times and in particular by not more than 5 times and further in particular by not more than double the maximum diameter of the exhaust system at the location in which the sound is measured. The method comprises measuring sound in the interior of an exhaust system and calculating components of a first and at least one second ideal control signal for generating an anti-airborne sound in the exhaust system by means of the measured sound, wherein the components in each case comprise two first and second sine wave oscillations with first and second amplitudes phase-shifted by 90 degrees relative to each other, wherein the frequency of the two first sine wave oscillations of the first ideal control signal phase-shifted by 90 degrees differs from the frequency of the two second sine wave oscillations of the second ideal control signal phase-shifted by 90 degrees. Following this, a current phase shift between the components of the first ideal control signal and the components of the at least one second ideal control signal is determined, and from the first amplitudes a first overall amplitude and from the second amplitudes at least one further overall amplitude are calculated. The amounts (i.e. absolute values) of the first and the at least one further overall amplitudes are added through vector addition taking into account the phase shift, in order to obtain a current overall amplitude. This current overall amplitude is (by its amount) compared with a predetermined reference amplitude in order to determine if the current overall amplitude is greater than the reference amplitude. By doing so it is determined if the current overall amplitude of the ideal control signals exceeds the load capacity of an employed loudspeaker or not.

If the current overall amplitude (by its amount) is greater than the reference amplitude and thus an overloading of the at least one loudspeaker has to be expected, a current correction factor is calculated from the different reference amplitude and the current overall amplitude. It is obvious that this correction factor has to be continuously adapted, since it depends on the current phase shift between the components of the first ideal control signal and the components of the at least one second ideal control signal. The first and second amplitudes in each case are weighted with the current correction factor in order to obtain weighted first and second amplitudes. The sums of the respective products of the weighted first and second amplitudes with the associated first and second sine wave oscillations phase-shifted by 90 degrees are output as control signal to the at least one loudspeaker.

In the case that the current overall amplitude (by its amount) however is smaller or equal to the reference amplitude, and overloading of the at least one loudspeaker is thus not to be expected, the sums of the products of the first and second amplitudes of the first and second ideal control signal with the associated first and second sine wave oscillations phase-shifted by 90 degrees are output as control signal to the at least one loudspeaker.

In this manner, a control signal including a plurality of frequencies of the anti-sound can be limited in a simple manner, wherein the continuously changing phase relationship between the frequencies can also be taken into consideration.

According to an embodiment cancellation takes place in amount and phase.

According to an embodiment, the current correction factor is obtained from a quotient of the reference amplitude and the current overall amplitude.

According to an embodiment, the first overall amplitude is obtained by taking the root from the sum of the squares of the first amplitudes, and the second overall amplitude is obtained by taking the root from the sum of the squares of the second amplitudes.

According to an embodiment, the reference amplitude is adapted to the maximum electric load capacity of the at least one loudspeaker.

Embodiments of an anti-sound system for exhaust systems of a combustion engine-operated vehicle comprise an anti-sound control, at least one loudspeaker and an error microphone. The at least one loudspeaker is connected to the anti-sound control for receiving control signals and designed to generate an anti-sound as a function of a control signal received from the anti-sound control in a sound generator, which can be fluidically connected to the exhaust system. In addition, the error microphone is connected to the anti-sound control and can be arranged in a location of the exhaust system located in the region of the fluid connection between sound generator and exhaust system and designed to measure sound in the interior of the exhaust system and output a corresponding measurement signal to the anti-sound control. Here, "in the region of the fluid connection", means that the error microphone is spaced from the exhaust gas flow along this fluid connection from the fluid connection between sound generator and exhaust system with respect to the exhaust gas flow downstream or upstream by not more than 10 times and in particular by not more than 5 times and further particularly by not more than double the maximum diameter of the exhaust system on this fluid connection along the exhaust gas flow. The anti-sound control is designed for carrying out the method described above, in order to at least partially and preferably completely cancel signals (and thus airborne sound conducted in the exhaust system) by outputting the control signal to the at least one loudspeaker. This sound cancellation is to be audible and measurable at least outside the exhaust system, but preferably also within the exhaust system.

According to an embodiment cancellation takes place in amount and phase.

Embodiments of a motor vehicle comprise a combustion engine, an exhaust system, which is fluidically connected to the combustion engine, and the anti-sound system described above, wherein the sound generator is connected to the exhaust system and the error microphone is arranged in or on the exhaust system.

Reference is made in this connection, that in this publication, unless explicitly stated otherwise in detail, the term "controlling" is used synonymously with the term "regulating" throughout and deviating from German language usage. This relates also to all grammatical permutations of both terms. In this publication, the term "control" can therefore comprise a return of a regulating variable or its measurement value, just as the term "regulation" can relate to a simple control chain.

It is pointed out, furthermore, that the terms "encompass", "comprise", "contain", "include" and "with" as well as their grammatical permutations must generally be perceived as non-conclusive enumeration of features such as for example method steps, devices, regions, variables and the like and in no way exclude the presence of other or additional features or groupings of other or additional features.

Further features of the invention are obtained from the following description of exemplary embodiments in conjunction with the claims and the Figures. In the Figures, same or similar elements are designated with same or similar reference characters. It is pointed out that the invention is not restricted to the embodiments of the exemplary embodiments described, but is defined by the scope of the enclosed patent claims. In particular, the individual features with embodiments according to the invention can be realised in another quantity and combination than with the examples mentioned below. In the following explanation of some exemplary embodiments of the invention, reference is made to the attached Figures, of which FIG. 1 schematically shows a perspective view of an anti-sound system according to an embodiment of the invention, FIG. 2 schematically shows a block diagram of the anti-sound system from FIG. 1 in interaction with an exhaust system of a combustion engine.

An anti-sound system according to an embodiment of the invention is described in the following making reference to the FIGS. 1 and 2.

The anti-sound system comprises a sound generator 3 in the form of a sound-insulated housing, which contains a loudspeaker 12 and is fluidically connected to an exhaust system 4 in the region of an end piece 2.

The tailpipe 1 comprises an orifice 2 in order to discharge exhaust gas conducted in the exhaust system 4 to the outside.

On the tailpipe 1 an error microphone 5 in the form of a pressure sensor is provided. The error microphone 5 measures pressure fluctuations and thus sound in the interior of the tailpipe 1 in a section downstream of a region, in which the fluid connection between exhaust system 4 and sound generator 3 is provided. However, it is stressed that the present invention is not restricted to such an arrangement of the error microphone. Generally, it is adequate when the error microphone is spaced along the exhaust gas flow from the fluid connection between sound generator and exhaust system with respect to the exhaust gas flow downstream or upstream by not more than 10 times and in particular by not more than 5 times and further particularly by not more than double the maximum diameter of the exhaust system at this fluid connection.

The loudspeaker 12 and the error microphone 5 are electrically connected to an anti-sound control 10. An amplifier 11 is connected between the anti-sound control 10 and the loudspeaker 12.

In the shown embodiment, the exhaust system 4 furthermore comprises a catalytic converter 7 arranged between a combustion engine 6 and the end piece 1 for cleaning the exhaust gas emitted by the combustion engine 6 and conducted in the exhaust system 4.

The mode of operation of the above anti-sound system is explained in more detail in the following by means of the flow diagrams from FIGS. 3A, 3B, 4 and 5.

1. Description of the First Embodiment According to FIGS. 3A, 3B 1.1 Description of the Main Branch of the Flow Diagram Shown in FIG. 3A, 3B In the first step S1, sound is measured in the interior of the end pipe 1 of the exhaust system 4 by the error microphone 5 and a corresponding value output to the anti-sound control 10.

Figure 3A:
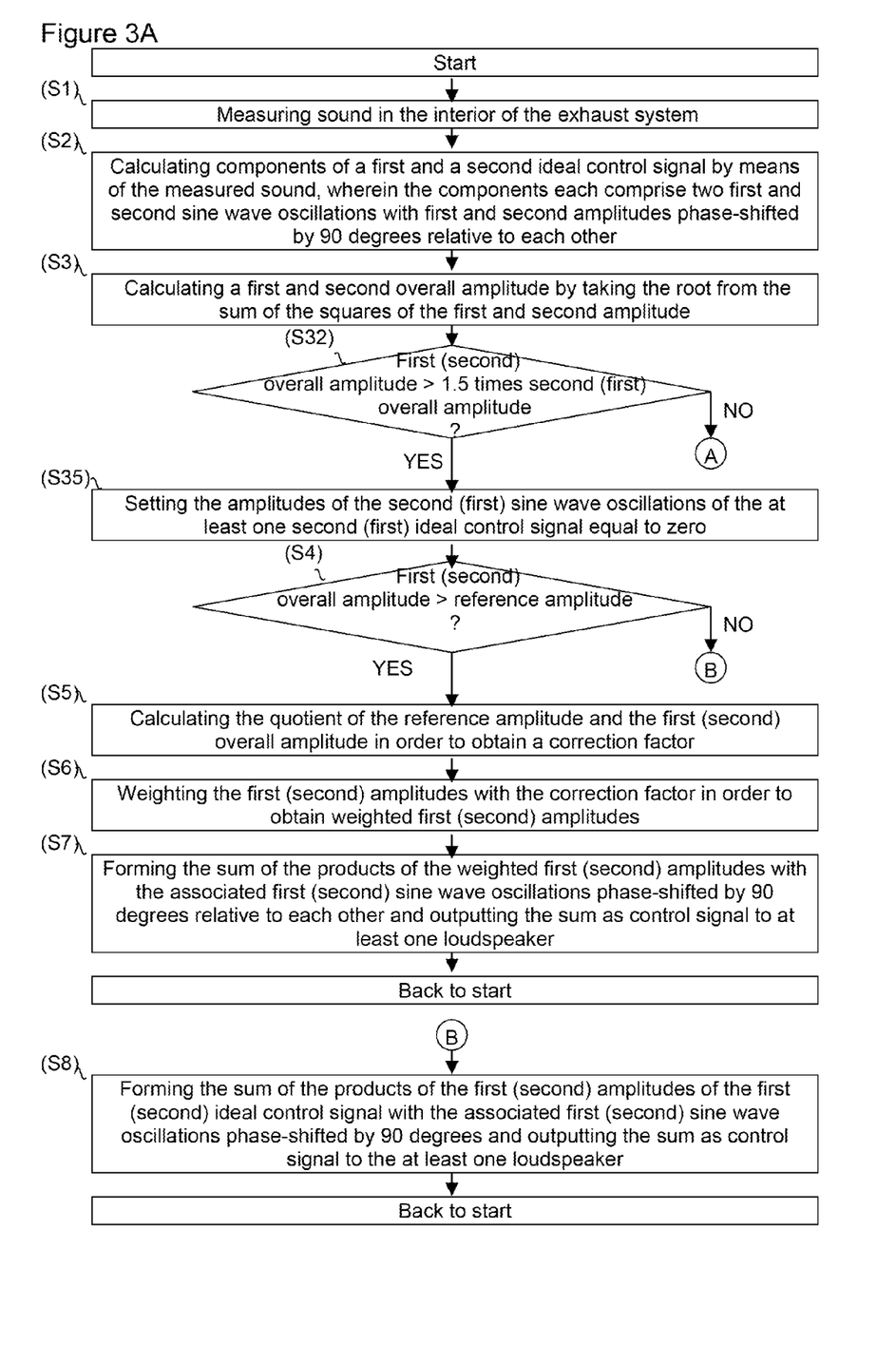
FIGS. 3A, 3B, shows a flow diagram of a method for controlling the anti-sound system for exhaust systems from FIGS. 1 and 2 according to a first embodiment.

In step S2, the anti-sound control 10 calculates components of a first and at least of a second ideal control signal by means of the value measured by the error microphone 5. The components of the ideal control signals each comprise two sine wave oscillations with associated amplitudes phase-shifted by 90 degrees relative to each other.

Figure 4:
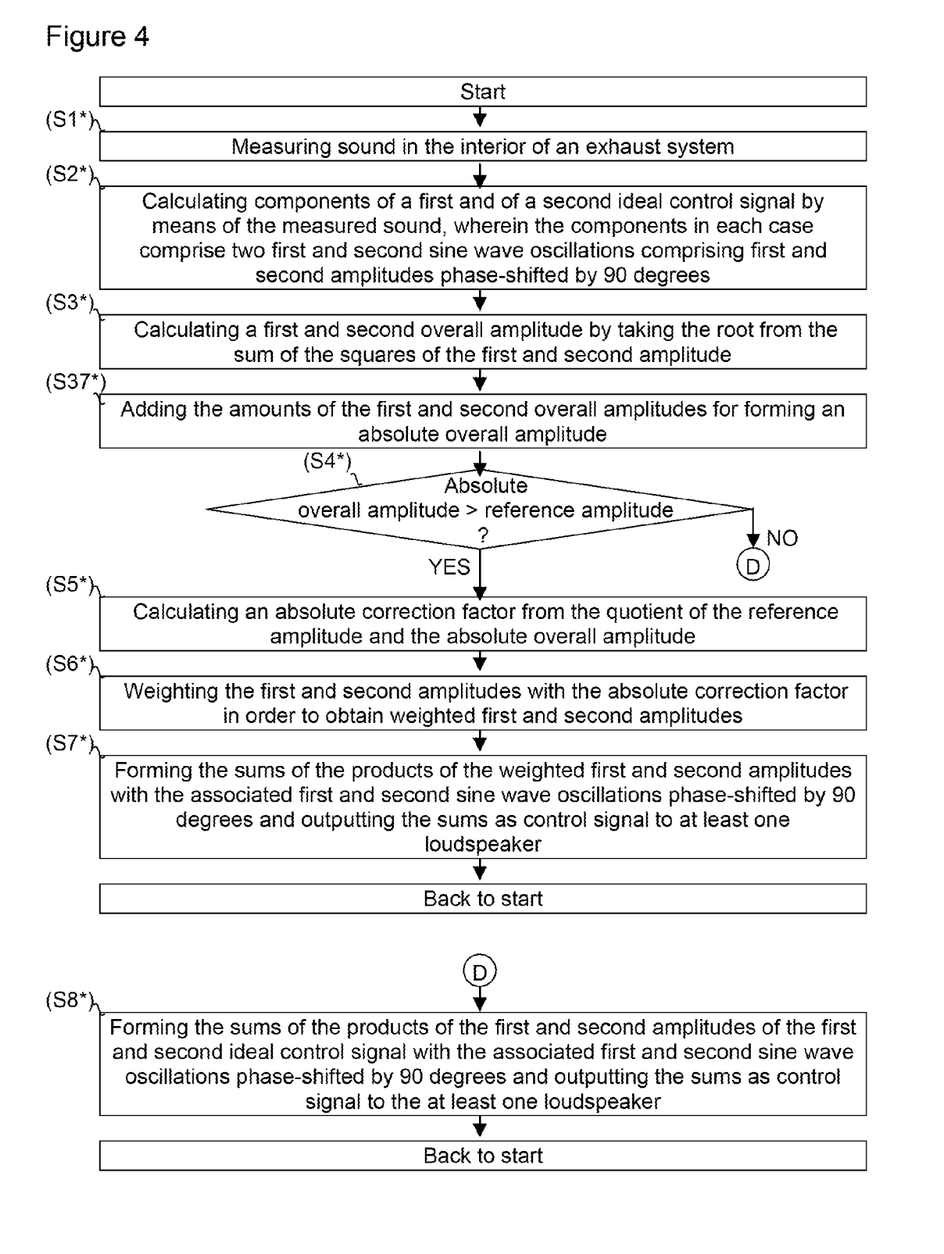
FIG. 4 shows a flow diagram of a method for controlling the anti-sound system for exhaust systems from FIGS. 1 and 2 according to a second embodiment.
Figure 5:
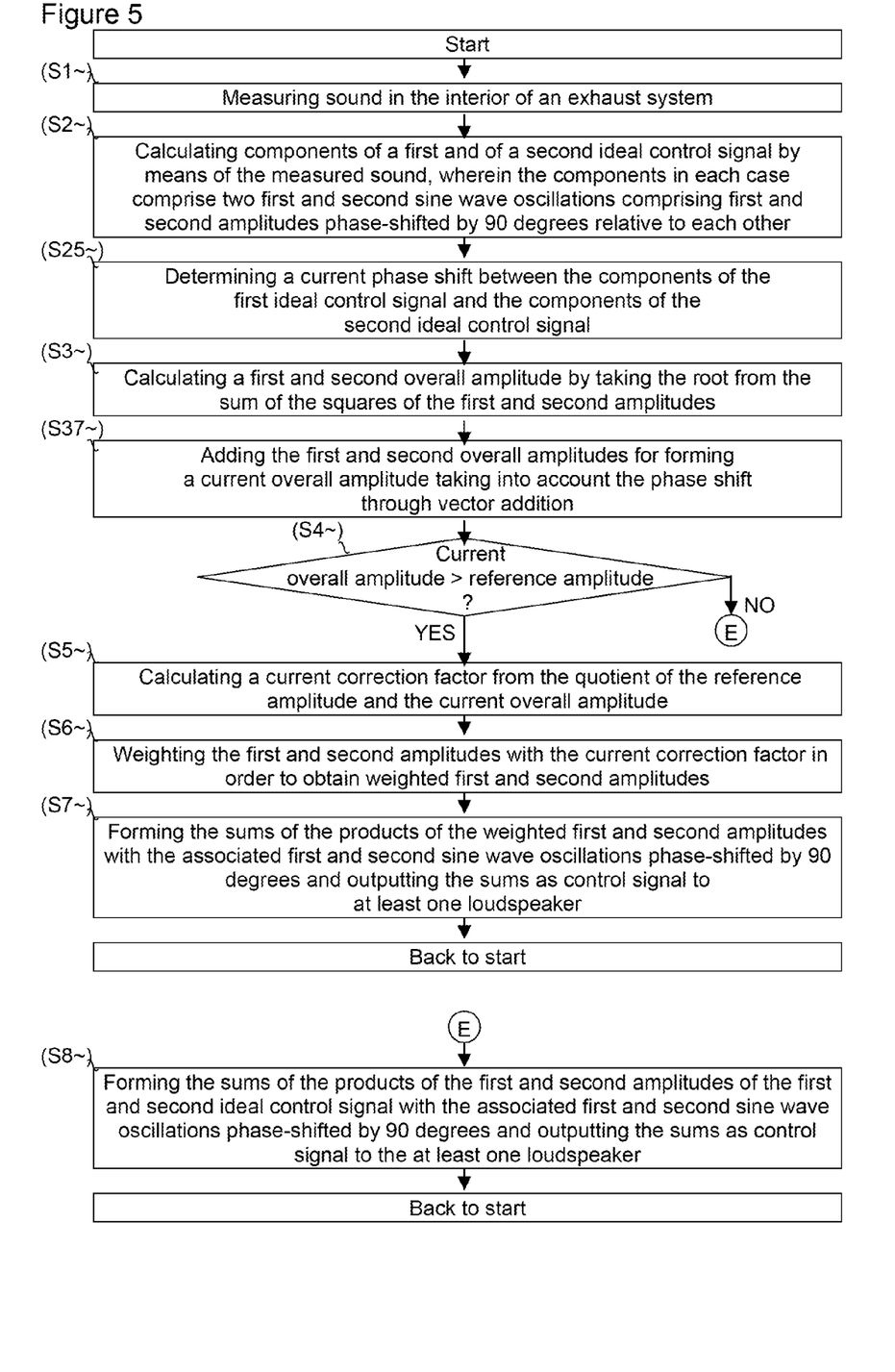
FIG. 5 shows a flow diagram for a method for controlling the anti-sound system for exhaust systems from FIGS. 1 and 2 according to a third embodiment.

In the embodiment shown in FIG. 3A (and also in the embodiment shown in FIGS. 4 and 5), the components of two ideal control signals each are calculated. The components of the first ideal control signal comprise two first sine wave oscillations $\sin(\omega t)$, $$\sin\left(\omega t + \frac{\pi}{2}\right)$$

phase-shifted by 90 degrees relative to each other with first amplitudes $A_1, A_2$. The components of the second ideal control signal comprise two second sine wave oscillations $\sin(\omega' t)$, $$\sin\left(\omega' t + \frac{\pi}{2}\right),$$

phase-shifted by 90 degrees relative to each other with second amplitudes $A_1', A_2'$. Here, the frequency of the two first sine wave oscillations, $\sin(\omega t)$, $$\sin\left(\omega t + \frac{\pi}{2}\right)$$

of the first ideal control signal phase-shifted by 90 degrees relative to each other differs from the frequency of the two second sine wave oscillations $\sin(\omega't)$, $$\sin\left(\omega't + \frac{\pi}{2}\right)$$

of the second ideal control signal phase-shifted by 90 degrees. As a consequence, a phase-shift between the components of the first control signal and the corresponding components of the second control signal changes continuously.

Evidently, a plurality of second ideal control signals can also be calculated with two sine wave oscillations each phase-shifted by 90 degrees relative to each other, wherein the sine wave oscillations of different ideal control signals then each have different frequencies. It is also possible to calculate only the components of one ideal control signal. In the last mentioned case, only the main frequency of the exhaust gas emitted by the combustion engine 6 and conducted in the exhaust system 4 can be cancelled or reduced through generated anti-sound.

In the following step S3, a first overall amplitude $A_{ges}$ is calculated from the first amplitudes $A_1$, $A_2$ of the first ideal control signal and from the second amplitudes $A_1'$, $A_2'$ of the second ideal control signal, a second overall amplitude $A_{ges}'$ is calculated.

In the shown embodiment, this is performed by taking the root from the sum of the squares of the first amplitudes $A_1$, $A_2$, in order to obtain the first overall amplitude $A_{ges}$ $(A_{ges}=\sqrt{(A_1^2+A_2^2)})$, and by taking the root from the sum of the squares of the second amplitudes $A_1'$, $A_2'$, in order to obtain the second overall amplitude $A_{ges}'$ $(A_{ges}'=\sqrt{(A_1'^2+A_2'^2)})$. The present invention however is not restricted to this procedure.

Following this, the first and second overall amplitude $A_{ges}$, $A_{ges}'$ are compared with one another in step S32 in order to determine if the overall amplitude of one of the ideal control signals is greater than the overall amplitude of the at least one other ideal control signal by more than 1.5 times (and in particular by more than 2 times and further particularly by more than 5 times).

If this is the case, the amplitudes of those ideal control signals which form the smaller overall amplitude, are set equal to zero in step S35. In this manner, the further method can be focused on the dominating ideal control signal.

Concretely, this means in the present embodiment that the amplitudes of the second sine wave oscillations of the at least one second ideal control signal are set equal to zero, when the first overall amplitude is more than 1.5 times the size (and in particular more than 2 times the size and further particularly more than 5 times the size) than the second overall amplitudeor $A_{ges}>1.5\cdot A_{ges}'$ or $A_{ges}>2\cdot A_{ges}'$ or $A_{ges}>5\cdot A_{ges}'$). Accordingly, the amplitudes of the first sine wave oscillation of the first ideal control signal are set equal to zero, when the second overall amplitude is more than 1.5 times the size (and in particular more than 2 times the size and further particularly more than 5 times the size) than the first overall amplitude ($A_{ges}'>1.5\cdot A_{ges}$ or $A_{ges}'>2\cdot A_{ges}$ or $A_{ges}'>5\cdot A_{ges}$).

Figure 3B:
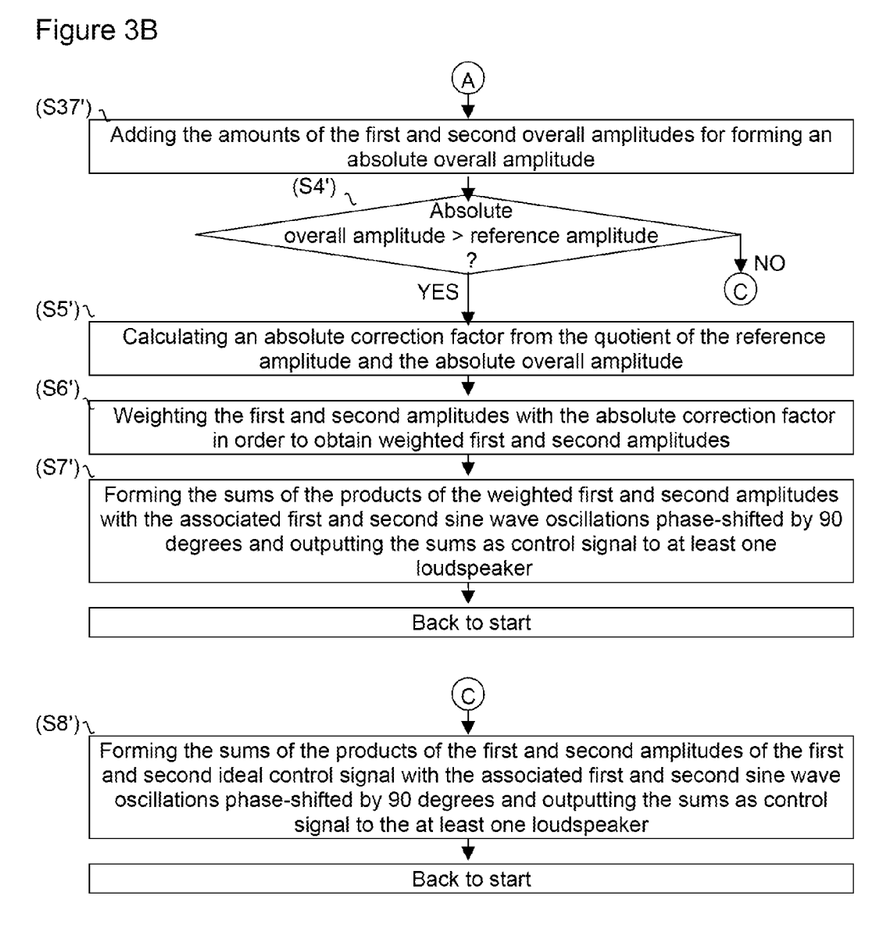

In the case that the overall amplitude of none of the ideal control signals is greater by more than 1.5 times (and in particular more than 2 times and further particularly more than 5 times) than the overall amplitude of the at least one other ideal control signal, the method changes to branch "A" of the flow diagram of FIGS. 3A and 3B. This branch is explained in more detail later on.

It is emphasised that the steps S32 and S35 are facultative. These steps can be omitted in particular when in step S2 only components of a single ideal control signal are calculated.

Following this, the remaining overall amplitude $A_{ges}$ (the overall amplitude of the signal, whose amplitudes were not set to zero) are compared with a predetermined reference amplitude $A_{max}$ in step S4 in order to determine if this overall amplitude $A_{ges}$ is greater than the reference amplitude $A_{max}$.

The reference amplitude $A_{max}$ is a parameter, which in this case is adapted to the maximum electric load capacity of the loudspeaker 12.

In the case that the overall amplitude $A_{ges}$ is greater than the reference amplitude $A_{max}$ ($A_{ges}>A_{max}$), a correction factor $Q_{korr}$ is calculated $$\left(Q_{korr} = \frac{A_{max}}{A_{ges}}\right)$$

by calculating the quotient of the reference amplitude $A_{max}$ and the total amplitude $A_{ges}$.

In the case that the overall amplitude $A_{ges}$ however is smaller or equal to the reference amplitude $A_{max}$ ($A_{ges}\leq A_{max}$), the method changes to branch "B" of the flow diagram of FIGS. 3A and 3B. This branch is explained in more detail later on.

Following this, the amplitudes $A_1$, $A_2$ which are not set to zero are weighted with the correction factor $Q_{korr}$ in step S6, in order to obtain weighted amplitudes $A_{1gew}$, $A_{2gew}$ ($A_{1gew}=Q_{korr}\cdot A_1$, $A_{2gew}=Q_{korr}\cdot A_2$).

These weighted amplitudes $A_{1gew}$, $A_{2gew}$ are multiplied in step S7 with the associated first sine wave oscillations $\sin(\omega t)$;

$$\sin\left(\omega t + \frac{\pi}{2}\right)$$

phase-shifted by 90 degree relative to each other, and the products added $$\left(Z = A_{1gew}\cdot\sin(\omega t) + A_{2gew}\cdot\sin\left(\omega t + \frac{\pi}{2}\right)\right),$$

for forming a control signal Z to be output to the at least one loudspeaker 12 before the method restarts from the beginning.

1.2 Description of the Branch "A" of the Flow Diagram Shown in FIG. 3A, 3B

In the case that the overall amplitude of none of the ideal control signals is greater by more than 1.5 times (and in particular more than 2 times and further particularly more than 5 times) the size of the overall amplitude of the at least one other ideal control signal, the amounts (i.e. absolute values) of the first and second overall amplitude $A_{ges}$, $A_{ges}'$ are added together for forming an absolute overall amplitude ($A_{gesabsol}=|A_{ges}|+|A_{gen}'|$) following the step S3 of calculating the overall amplitudes $A_{ges}$, $A_{ges}'$ in S37'.

The absolute overall amplitude $A_{gesabsol}$ so obtained is compared in step S4' with a predetermined reference amplitude $A_{max}$ in order to determine if the absolute overall amplitude $A_{gesabsol}$ is greater than the reference amplitude $A_{max}$.

In the case that the absolute overall amplitude $A_{gesabsol}$ is greater than the reference amplitude $A_{max}$ ($A_{gesabsol}>A_{max}$), an absolute correction factor $Q_{korrabsol}$ is calculated in step S5' from the reference amplitude $A_{max}$ and the absolute overall amplitude $A_{gesabsol}$.

Here, calculating the absolute correction factor $Q_{korrabsol}$ is also carried out by forming the quotient of the reference amplitude $A_{max}$ and the absolute overall amplitude $A_{gesabsol}$ in order to obtain the absolute correction factor $Q_{korrabsol}$ $$\left( Q_{korrabsol} = \frac{A_{max}}{A_{gesabsol}} \right).$$

In the case that the absolute overall amplitude $A_{gesabsol}$ however is smaller or equal to the reference amplitude $A_{max}$ ($A_{gesabsol} \leq A_{max}$) the method changes to branch "C" of the flow diagram. This branch is explained in more detail later on.

This is followed in step S6' by a weighting of the first and second amplitudes $A_1$, $A_2$, $A_1'$, $A_2'$ with the absolute correction factor $Q_{korrabsol}$, in order to obtain weighted first and second amplitudes $A_{1gew}$, $A_{2gew}$, $A_{1gew}'$, $A_{2gew}'$ ($A_{1gew} = Q_{korrabsol} \cdot A_1$, $A_{2gew} = Q_{korrabsol} \cdot A_2$, $A_{1gew}' = Q_{korrabsol} \cdot A_2'$, $A_{2gew}' = Q_{korrabsol} \cdot A_2'$).

Following this, the sums of the products of the weighted first and second amplitudes $A_{1gew}$, $A_{2gew}$, $A_{1gew}'$, $A_{2gew}'$ are formed in step S7' with the associated first and second sine wave oscillations $\sin(\omega t)$, $$\sin\left(\omega t + \frac{\pi}{2}\right),$$

$\sin(\omega' t)$, $$\sin\left(\omega' t + \frac{\pi}{2}\right)$$

phase-shifted by 90 degrees $$(Z = A_{1gew} \cdot \sin(\omega t) + A_{2gew} \cdot \sin\left(\omega t + \frac{\pi}{2}\right),$$
$$Z' = A_{1gew}' \cdot \sin(\omega' t) + A_{2gew}' \cdot \sin\left(\omega' t + \frac{\pi}{2}\right)),$$

and output as control signal to the at least one loudspeaker 12, before the method restarts from the beginning.

1.3 Description of the Branch "C" of the Flow Diagram Shown in FIG. 3A, 3B

In the case that the absolute overall amplitude $A_{gesabsol}$ is smaller or equal to the reference amplitude $A_{max}$ ($A_{gesabsol} \leq A_{max}$), the sums of the products of the first and second amplitudes $A_{1gew}$, $A_{2gew}$, $A_{1gew}'$, $A_{2gew}'$ of the first and second ideal control signal are formed in step S8' with the associated first and second sine wave oscillations $\sin(\omega t)$, $$\sin\left(\omega t + \frac{\pi}{2}\right),$$

$\sin(\omega' t)$, $$\sin\left(\omega' t + \frac{\pi}{2}\right)$$

phase-shifted by 90 degrees without weighting $$(Z = A_1 \cdot \sin(\omega t) + A_2 \cdot \sin\left(\omega t + \frac{\pi}{2}\right), Z' = A_1' \cdot \sin(\omega' t) + A_2' \cdot \sin\left(\omega' t + \frac{\pi}{2}\right)),$$

and output as control signals to the at least one loudspeaker 12, before the method restarts from the beginning.

1.4 Description of the Branch "B" of the Flow Diagram Shown in FIG. 3A, 3B

In the case that the overall amplitude $A_{ges}$ however is smaller or equal to the reference amplitude $A_{max}$, $A_{ges} \leq A_{max}$, the sum of the products of the amplitudes $A_1$, $A_2$ of the respective ideal control signal not set to zero is formed in step S8 with the sine wave oscillations $\sin(\omega t)$;

$$\sin\left(\omega t + \frac{\pi}{2}\right)$$

phase-shifted by 90 degrees in order to obtain the control signal Z to be output to the at least one loudspeaker 12

$$(Z = A_1 \cdot \sin(\omega t) + A_2 \cdot \sin\left(\omega t + \frac{\pi}{2}\right)),$$

before the method restarts from the beginning.

2. Description of the Second Embodiment According to FIG. 4

The steps S1* to S3* of the second embodiment correspond to the steps S1 to S3 of the first embodiment described above making reference to the FIGS. 3A and 3B. The steps S37* to S8* correspond to the steps S37' to S8' of the first embodiment described above making reference to the FIGS. 3A and 3B. To avoid repetitions, reference is therefore made to the above embodiments.

The second embodiment differs from the first embodiment in particular in that in step S2* the components of more than one ideal control signal are calculated by the anti-sound control 10 in any case. Furthermore, focusing the method on a dominating ideal control signal and setting the amplitudes of the at least one other ideal control signal equal to zero is also omitted in the second embodiment. Following this, the components of all ideal control signals are weighted in the second embodiment, if this is required to avoid overloading the at least one loudspeaker 12.

3. Description of the Third Embodiment According to FIG. 5

The steps S1~, S2~, S3~ and S4~ to S8~ of the third embodiment in principle correspond to the steps S1*, S2*, S3* and S4* to S8* of the second embodiment described above making reference to FIG. 4. To avoid repetitions, reference is therefore made to the above embodiments.

The third embodiment differs from the second embodiment in particular in that in step S25~ in real time the current phase shift between the components of the first ideal control signal and the components of the second (and any further) ideal control signal is determined. This phase shift is taken into account in step S37~ with the addition of the first and second overall amplitude for forming a current overall amplitude. Practically, this is performed in that the first and second overall amplitudes are considered as vectors, and for taking into account the phase shift, a vector addition is carried out. Alternatively, the first and second overall amplitudes can also be considered as complex numbers and the addition carried out taking into account the phase shift in the complex numerical range.

Since in the third embodiment the current phase shift between the ideal control signals is taken into account, a current overall amplitude (by its amount) is compared with the reference amplitude in the steps S4~ and following, and a current correction factor calculated. It is obvious that the current overall amplitude and the current correction factor change permanently over time.

Following this, the components of all ideal control signals are weighted in the third embodiment in real time, if this is necessary to avoid overloading the at least one loudspeaker 12.

Figure 1:
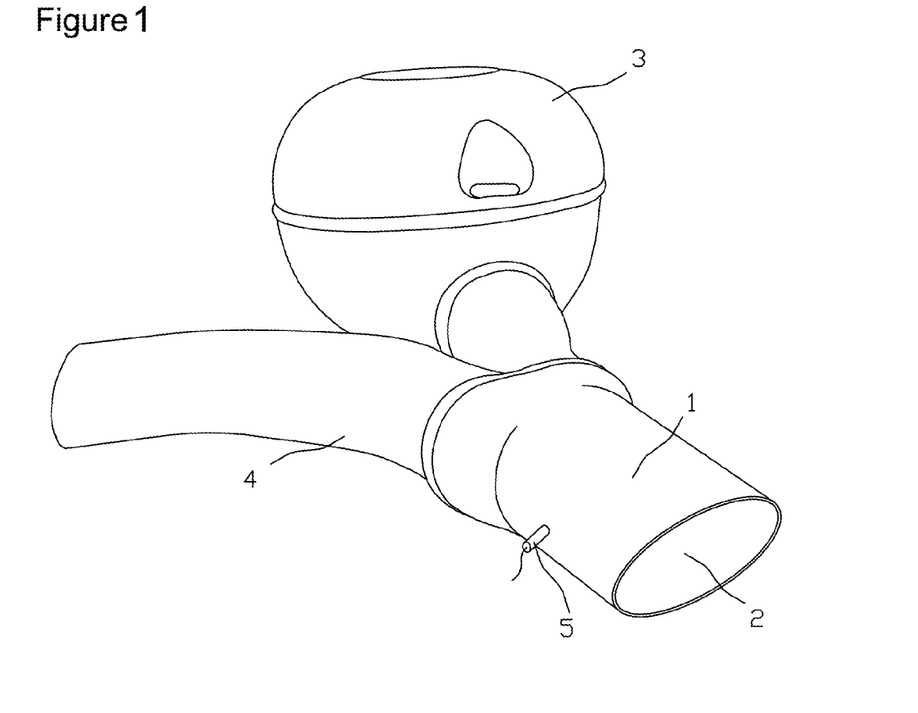
Figure 2:
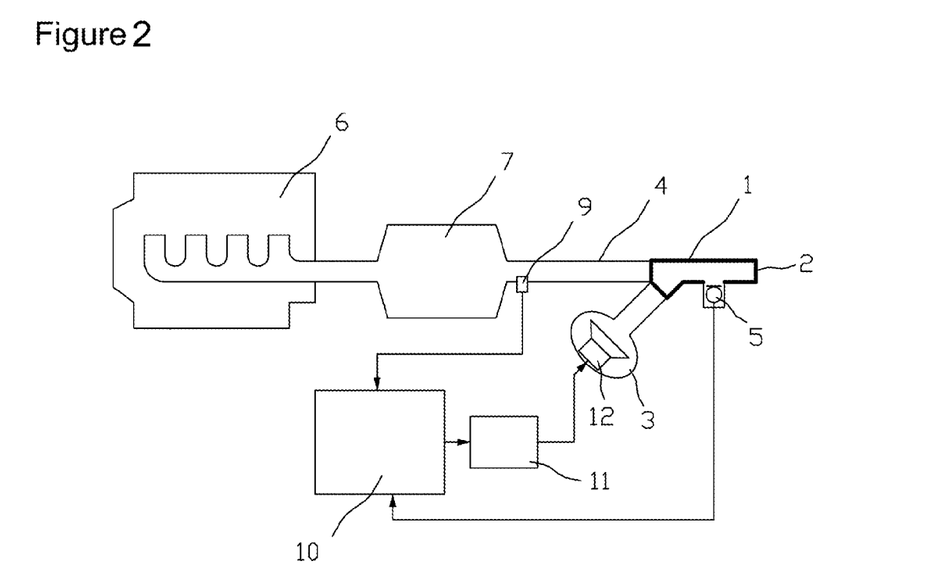
Figure 6:
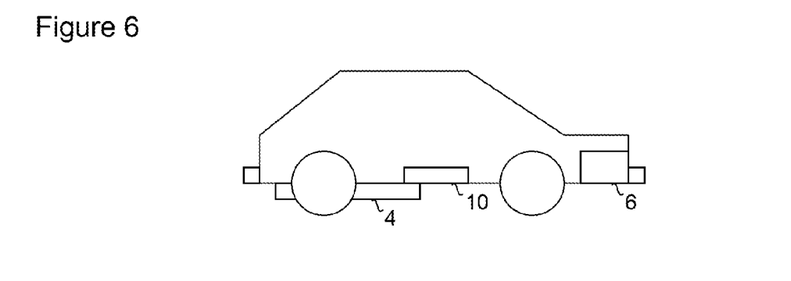
FIG. 6 shows a motor vehicle comprising the anti-sound system of FIG. 2.

A combustion engine operated motor vehicle housing the anti-sound system of FIGS. 1 and 2 is shown in FIG. 6. Reference is made to the description of FIGS. 1 and 2.

For the sake of clarity, only those elements, components and functions which promote understanding of the present invention are shown. Embodiments of the invention, however, are not restricted to the elements, but include further elements, components and functions insofar as these are required for their use or their scope of functions.

Even if the invention has been described above by means of a maximum of two ideal control signals, the present invention is not limited to these. On the contrary, the invention can be expanded to any number of ideal control signals.

The invention claimed is:

1. A method for controlling an anti-sound system for an exhaust system of a combustion engine-operated vehicle for generating an airborne sound in the exhaust system by means of measured sound, in order to at least partially cancel airborne sound generated by the combustion engine and conducted in the exhaust system in the region of the location in the exhaust system, in which the sound is measured, comprising the following steps:
   (S1) measuring sound in the interior of the exhaust system;
   (S2) calculating components of a first ideal control signal by means of the measured sound, wherein the components comprise two first sine wave oscillations with first amplitudes phase-shifted by 90 degrees relative to each other;
   (S3) calculating a first overall amplitude from the first amplitudes;
   (S4) comparing the first overall amplitude with a predetermined reference amplitude in order to determine if the first overall amplitude is greater than the reference amplitude;
   (S5) calculating a correction factor from the reference amplitude and the first overall amplitude if the first overall amplitude is greater than the reference amplitude;
   (S6) weighting of the first amplitudes with the correction factor, in order to obtain weighted first amplitudes, if the first overall amplitude is greater than the reference amplitude; and
   (S7) forming the sum of the products of the weighted first amplitudes with the associated first sine wave oscillations phase-shifted by 90 degrees relative to each other and outputting the sum as control signal on at least one loudspeaker, if the first overall amplitude is greater than the reference amplitude; or
   (S8) forming the sum of the products of the first amplitudes of the first ideal control signal with the associated first sine wave oscillations phase-shifted by 90 degrees and outputting the sum as control signal to the at least one loudspeaker, if the first overall amplitude is smaller or equal to the reference amplitude.

2. The method according to claim 1, wherein the step (S3) of calculating the first overall amplitude from the first amplitudes comprises taking the root from the sum of the squares of the first amplitudes, in order to obtain the first overall amplitude.

3. The method according to claim 1, wherein the step (S5) of calculating the correction factor from the reference amplitude and the first overall amplitude comprises calculating the quotient of the reference amplitude and the first overall amplitude in order to obtain the correction factor.

4. The method according to claim 1, wherein the step (S2) of calculating components of the first ideal control signal comprises calculating at least one second ideal control signal, which comprises second sine wave oscillations comprising second amplitudes phase-shifted by 90 degrees relative to each other, wherein the frequency of the two first sine wave oscillations of the first ideal control signal phase-shifted by 90 degrees relative to each other differs from the frequency of the two second sine wave oscillations of the second ideal control signal phase-shifted by 90 degrees relative to each other;
   wherein the step (S3) of calculating the first overall amplitude from the first amplitudes, comprises calculating a second overall amplitude from the second amplitudes; and
   wherein the method before the step (S4) of comparing the first overall amplitude with the predetermined reference amplitude, additionally comprises the following step:
   (S32) comparing the first and second overall amplitudes with one another; and
   (S35) setting the amplitudes of the second sine wave oscillations of the at least one second ideal control signal equal to zero, if the first overall amplitude is more than 1.5 times the size and in particular more than 2 times the size and further particularly more than 5 times the size of the second overall amplitude or setting the amplitudes of the first sine wave oscillation of the first ideal control signal equal to zero, if the second overall amplitude is more than 1.5 times the size and in particular more than 2 times and further particularly more than 5 times the size of the first overall amplitude.

5. The method according to claim 4, wherein the step (S3) of calculating the first overall amplitude from the first amplitudes and calculating the second overall amplitude from the second amplitudes comprises taking the root from the sum of the squares of the first and second amplitudes respectively, in order to obtain the first and second overall amplitude.

6. A method for controlling an anti-sound system for exhaust systems of a combustion engine-operated vehicle, in order to at least partially cancel airborne sound generated by a combustion engine and conducted in the exhaust system in the region of the location in the exhaust system, in which the sound is measured, comprising the following steps:
   (S1*) measuring sound in the interior of an exhaust system;
   (S2*) calculating components of a first and at least one second ideal control signal for generating an anti-airborne sound in the exhaust system by means of the measured sound, wherein the components in each case comprise two first and second sine wave oscillations comprising first and second amplitudes phase-shifted by 90 degrees relative to each other, wherein the frequency of the two first sine wave oscillations of the first ideal control signal phase-shifted by 90 degrees differs from the frequency of the two second sine wave oscillations of the second ideal control signal phase-shifted by 90degrees;

(S3*) calculating a first overall amplitude from the first amplitudes and a second overall amplitude from the second amplitudes;

(S35*) adding the amounts of the first and second overall amplitudes for forming an absolute overall amplitude;

(S4*) comparing the absolute overall amplitude with a predetermined reference amplitude in order to determine if the absolute overall amplitude is greater than the reference amplitude;

(S5*) calculating an absolute correction factor from the reference amplitude and the absolute overall amplitude, if the absolute overall amplitude is greater than the reference amplitude;

(S6*) weighting of the first and second amplitudes with the absolute correction factor in order to obtain weighted first and second amplitudes, if the absolute overall amplitude is greater than the reference amplitude; and (S7*) forming the sums of the products of the weighted first and second amplitudes with the associated first and second sine wave oscillations phase-shifted by 90 degrees and outputting the sums as control signal to at least one loudspeaker, if the absolute overall amplitude is greater than the reference amplitude; or (S8*) forming the sums of the products of the first and second amplitudes of the first and second ideal control signal with the associated first and second sine wave oscillations phase-shifted by 90 degrees and outputting the sums as control signal to the at least one loudspeaker if the absolute overall amplitude is smaller than or equal to the reference amplitude.

7. The method according to claim 6, wherein the step (S5*) of calculating the absolute correction factor from the reference amplitude and the absolute overall amplitude comprises forming the quotient of the reference amplitude and the absolute overall amplitude in order to obtain the absolute correction factor.

8. A method for controlling an anti-sound system for exhaust systems of a combustion engine-operated vehicle, in order to at least partially cancel airborne sound generated by a combustion engine and conducted in the exhaust system in the region of the location in the exhaust system in which the sound is measured, comprising the following steps:

(S1~) measuring sound in the interior of an exhaust system;

(S2~) calculating components of a first and at least a second ideal control signal for generating an anti-airborne sound in the exhaust system by means of the measured sound, wherein the components in each case comprise two first and second sine wave oscillations comprising first and second amplitudes phase-shifted by 90 degrees relative to each other, wherein the frequency of the two first sine wave oscillations of the first ideal control signal phase-shifted by 90 degrees differs from the frequency of the two second sine wave oscillations of the second ideal control signal phase-shifted by 90 degrees;

(S25~) determining a current phase shift between the components of the first ideal control signal and the components of the at least one second ideal control signal;

(S3~) calculating a first overall amplitude from the first amplitudes and at least one further overall amplitude from the second amplitudes;

(S35~) adding the amounts of the first overall amplitude and of the at least one further overall amplitude taking into account the phase shift through vector addition for forming a current overall amplitude;

(S4~) comparing the current overall amplitude with a predetermined reference amplitude in order to determine if the current overall amplitude is greater than the reference amplitude;

(S5~) calculating a current correction factor from the reference amplitude and the current overall amplitude, if the current overall amplitude is greater than the reference amplitude;

(S6~) weighting the first and second amplitudes with the current correction factor in order to obtain weighted first and second amplitudes, if the current overall amplitude is greater than the reference amplitude; and (S7~) forming the sums of the products of the weighted first and second amplitudes with the associated first and second sine wave oscillations phase-shifted by 90 degrees and outputting the sums as control signal to at least one loudspeaker, if the current overall amplitude is greater than the reference amplitude; or (S8~) forming the sums of the products of the first and second amplitudes of the first and second ideal control signal with the associated first and second sine wave oscillations phase-shifted by 90 degrees and outputting the sums as control signal to the at least one loudspeaker, if the current overall amplitude is smaller than or equal to the reference amplitude.

9. The method according to claims 6, wherein the step (S5~) of calculating the current correction factor from the reference amplitude and the current overall amplitude comprises forming the quotient of the reference amplitude and the current overall amplitude in order to obtain the current correction factor.

10. The method according to claim 6, wherein the step (S3*; S3~) of calculating the first overall amplitude from the first amplitudes and the second overall amplitude from the second amplitudes comprises taking the root from the sum of the squares of the first amplitudes, in order to obtain the first overall amplitude, and taking the root from the sum of the squares of the second amplitudes, in order to obtain the second overall amplitude.

11. The method according claim 1, wherein the reference amplitude is adapted to the maximum electric load capacity of the at least one loudspeaker.

12. An anti-sound system for exhaust systems of a combustion engine-operated vehicle, comprising:
an anti-sound control;
at least one loudspeaker, which is connected to the anti-sound control for receiving control signals, wherein the loudspeaker is designed for generating an anti-sound as a function of a control signal received from the anti-sound control in a sound generator, which can be fluidically connected to the exhaust system; and
an error microphone, which is connected to the anti-sound control and can be arranged in a location of the exhaust system located with respect to the exhaust gas flow in the region of the fluid connection between sound generator and exhaust system, wherein the error microphone is designed to measure sound in the interior of the exhaust system and to output a corresponding measurement signal to the anti-sound control;
wherein the anti-sound control is designed to carry out the method according to claim 1, in order to at least partially cancel signals obtained from the error microphone (5) through outputting the control signal to the at least one loudspeaker.

13. A motor vehicle comprising:
a combustion engine;
an exhaust system, which is fluidically connected to the combustion engine; and
an anti-sound system according to claim 12, wherein the sound generator and the error microphone are connected to the exhaust system.

14. The method according to claim 2, wherein the step (S5) of calculating the correction factor from the reference amplitude and the first overall amplitude comprises calculating the quotient of the reference amplitude and the first overall amplitude in order to obtain the correction factor.

15. The method according to claim 14, wherein the step (S2) of calculating components of the first ideal control signal comprises calculating at least one second ideal control signal, which comprises second sine wave oscillations comprising second amplitudes phase-shifted by 90 degrees relative to each other, wherein the frequency of the two first sine wave oscillations of the first ideal control signal phase-shifted by 90 degrees relative to each other differs from the frequency of the two second sine wave oscillations of the second ideal control signal phase-shifted by 90 degrees relative to each other;
wherein the step (S3) of calculating the first overall amplitude from the first amplitudes, comprises calculating a second overall amplitude from the second amplitudes; and
wherein the method before the step (S4) of comparing the first overall amplitude with the predetermined reference amplitude, additionally comprises the following step:
(S32) comparing the first and second overall amplitudes with one another; and
(S35) setting the amplitudes of the second sine wave oscillations of the at least one second ideal control signal equal to zero, if the first overall amplitude is more than 1.5 times the size and in particular more than 2 times the size and further particularly more than 5 times the size of the second overall amplitude or setting the amplitudes of the first sine wave oscillation of the first ideal control signal equal to zero, if the second overall amplitude is more than 1.5 times the size and in particular more than 2 times and further particularly more than 5 times the size of the first overall amplitude.

16. The method according to claim 15, wherein the step (S3) of calculating the first overall amplitude from the first amplitudes and calculating the second overall amplitude from the second amplitudes comprises taking the root from the sum of the squares of the first and second amplitudes respectively, in order to obtain the first and second overall amplitude.

17. The method according to claim 7, wherein the step (S5~) of calculating the current correction factor from the reference amplitude and the current overall amplitude comprises forming the quotient of the reference amplitude and the current overall amplitude in order to obtain the current correction factor.

18. The method according to claim 8, wherein the step (S5~) of calculating the current correction factor from the reference amplitude and the current overall amplitude comprises forming the quotient of the reference amplitude and the current overall amplitude in order to obtain the current correction factor.

19. The method according to claim 17, wherein the step (S3*; S3~) of calculating the first overall amplitude from the first amplitudes and the second overall amplitude from the second amplitudes comprises taking the root from the sum of the squares of the first amplitudes, in order to obtain the first overall amplitude, and taking the root from the sum of the squares of the second amplitudes, in order to obtain the second overall amplitude.

20. The method according to claim 18, wherein the step (S3*; S3~) of calculating the first overall amplitude from the first amplitudes and the second overall amplitude from the second amplitudes comprises taking the root from the sum of the squares of the first amplitudes, in order to obtain the first overall amplitude, and taking the root from the sum of the squares of the second amplitudes, in order to obtain the second overall amplitude.

21. The method according to claim 6, wherein the reference amplitude is adapted to the maximum electric load capacity of the at least one loudspeaker.

22. The method according to claim 8, wherein the reference amplitude is adapted to the maximum electric load capacity of the at least one loudspeaker.

23. An anti-sound system for exhaust systems of a combustion engine-operated vehicle, comprising:
an anti-sound control;
at least one loudspeaker, which is connected to the anti-sound control for receiving control signals, wherein the loudspeaker is designed for generating an anti-sound as a function of a control signal received from the anti-sound control in a sound generator, which can be fluidically connected to the exhaust system; and
an error microphone, which is connected to the anti-sound control and can be arranged in a location of the exhaust system located with respect to the exhaust gas flow in the region of the fluid connection between sound generator and exhaust system, wherein the error microphone is designed to measure sound in the interior of the exhaust system and to output a corresponding measurement signal to the anti-sound control;
wherein the anti-sound control is designed to carry out the method according to claim 6, in order to at least partially cancel signals obtained from the error microphone through outputting the control signal to the at least one loudspeaker.

24. An anti-sound system for exhaust systems of a combustion engine-operated vehicle, comprising:
an anti-sound control;
at least one loudspeaker, which is connected to the anti-sound control for receiving control signals, wherein the loudspeaker is designed for generating an anti-sound as a function of a control signal received from the anti-sound control in a sound generator, which can be fluidically connected to the exhaust system; and
an error microphone, which is connected to the anti-sound control and can be arranged in a location of the exhaust system located with respect to the exhaust gas flow in the region of the fluid connection between sound generator and exhaust system, wherein the error microphone is designed to measure sound in the interior of the exhaust system and to output a corresponding measurement signal to the anti-sound control;
wherein the anti-sound control is designed to carry out the method according to claim 8, in order to at least partially cancel signals obtained from the error microphone through outputting the control signal to the at least one loudspeaker.

25. A motor vehicle comprising:
a combustion engine;
an exhaust system, which is fluidically connected to the combustion engine; and an anti-sound system according to claim 23, wherein the sound generator and the error microphone are connected to the exhaust system.

26. A motor vehicle comprising:
a combustion engine;
an exhaust system, which is fluidically connected to the combustion engine; and
an anti-sound system according to claim 24, wherein the sound generator and the error microphone are connected to the exhaust system.

* * * * *